Dec. 23, 1958  J. P. WATSON  2,866,109
AXIAL FLUX ELECTROMAGNETIC MACHINERY
Filed Aug. 31, 1956  5 Sheets-Sheet 1

JAMES P. WATSON
INVENTOR
HUEBNER, BEEHLER, WORREL & HERZIG
ATTORNEYS

Dec. 23, 1958 J. P. WATSON 2,866,109
AXIAL FLUX ELECTROMAGNETIC MACHINERY
Filed Aug. 31, 1956 5 Sheets-Sheet 2

JAMES P. WATSON
INVENTOR
HUEBNER BEEHLER WORREL & HERZIG
ATTORNEYS

Dec. 23, 1958     J. P. WATSON     2,866,109
AXIAL FLUX ELECTROMAGNETIC MACHINERY
Filed Aug. 31, 1956     5 Sheets-Sheet 3

JAMES P. WATSON
INVENTOR
HUEBNER BEEHLER WORREL & HERZIG
ATTORNEYS

Dec. 23, 1958　　　　　J. P. WATSON　　　　2,866,109
AXIAL FLUX ELECTROMAGNETIC MACHINERY
Filed Aug. 31, 1956　　　　　　　　　　5 Sheets-Sheet 5

JAMES P. WATSON
INVENTOR.
HUEBNER, BEEHLER, WORREL & HERZIG
ATTORNEYS

United States Patent Office 2,866,109
Patented Dec. 23, 1958

2,866,109
AXIAL FLUX ELECTROMAGNETIC MACHINERY
James P. Watson, Whittier, Calif.
Application August 31, 1956, Serial No. 607,422
22 Claims. (Cl. 310—37)

This invention relates to rotating electromagnetic machinery, and especially to such machinery adapted for intermittent or step by step rotation or oscillation of a shaft.

This invention further relates to sealing means adapted for use in such machinery.

It is an object of this invention to provide a complete machine which is not adversely affected by the severest acceleration forces, even during actual operation.

It is an object of this invention to provide a compact, simple rotary electromagnetic machine, wherein magnetic flux is produced and flows axially in the rotor and stator of the machine.

It is another object of this invention to provide such electromagnetic machinery especially adapted for oscillating use, i. e., use where the rotor oscillates back and forth.

It is another object of this invention to provide an oscillating electromagnetic machine having an output shaft which may be caused selectively to turn in one direction or the other depending upon the polarity of the voltage applied to the machine.

It is a further object of this invention to provide improved pawl and ratchet arrangements which may be used with rotating electromagnetic machinery, or which may be used if desired in other types of apparatus.

It is another object of this invention to provide an improved sealing arrangement for sealing a wire where it passes out of a sealed casing.

It is another object of this invention to provide an improved shaft seal for sealing between a shaft and a casing.

It is another object of this invention to provide improved clutch means for an electromagnetic rotating machine.

It is a further object of this invention to provide improved detent means for indexing a rotating part with respect to a stationary part as the rotating part comes to rest.

In accordance with these and other objects which will become apparent hereinafter, preferred forms and examples of the present invention will now be described with reference to the accompanying drawings wherein.

Figure 1:
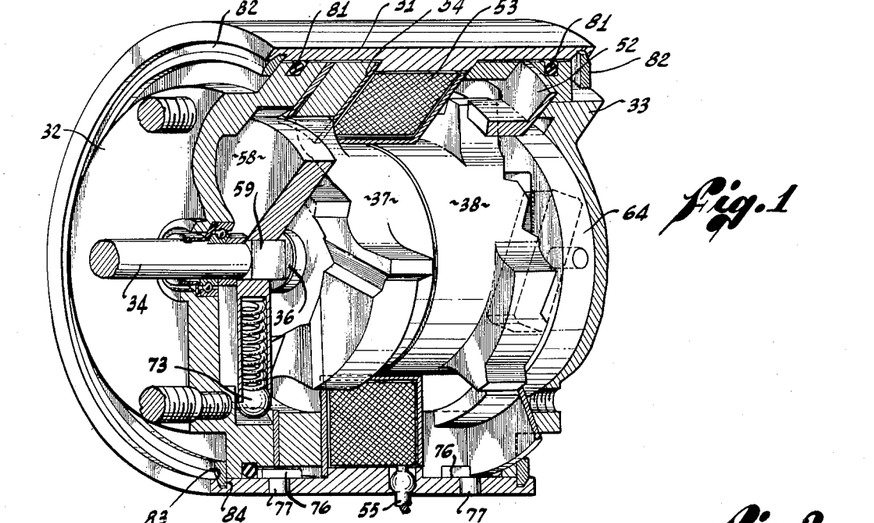
Fig. 1 is a partially sectioned perspective view of an oscillating electromagnetic machine embodying certain features of the present invention.

Referring to the drawings, and particularly to Fig. 1, there is illustrated a stator comprising frame means in the form of a case 31 made preferably of ferro-magnetic, but non-retentive material. The case 31 is preferably an open ended cylinder into which parts of the machine may be assembled from both ends.

The case 31 is closed at one end by an end plate or bell 32 and at the other end by another end plate or bell 33, both made of non-magnetic material. Journaled in and extending between the end bells 32 and 33 is a shaft 34 preferably non-magnetic. The center portion of the shaft is preferably enlarged as shown at 36; and coaxially circumjacent over this portion and rotatable thereon are journaled two rotor means or rotors 37 and 38. Except when clutched or coupled to the shaft, as will be explained hereinafter, the rotors 37 and 38 are free to rotate with respect to the shaft.

The two rotors are substantially identical, and will now be described with reference to the rotor 37, shown in end view in Fig. 4. The rotor is provided with three pole means or poles 39 extending radially outward from the body of the rotor as best seen in Fig. 1, and preferably formed integral with the rotor. Cooperating with the rotor poles 39 are three stator pole means or poles 40 formed inwardly projecting from, and preferably integral with, a stator field ring 41. With respect to position along the axis of the shaft 34, the poles 39 and 40 are in alignment, i. e., they occupy a common plane (or volume between a pair of planes) normal to the shaft 34.

Figure 4:
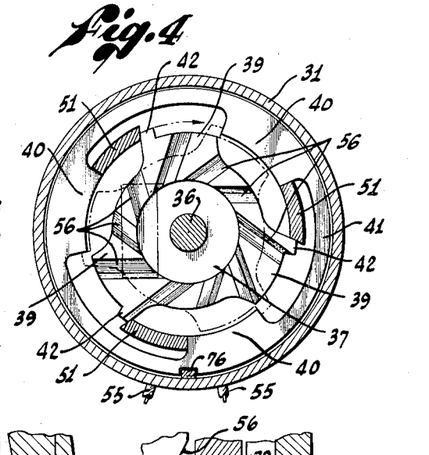
Fig. 4 is a cross section take on line 4—4 in Fig. 2.

Each of the poles 39 is provided on its trailing end with a further outward projection 42, which comes into engagement with the side of the corresponding stator pole 40 when the rotor 37 is rotated clockwise (Fig. 4). Like the case 31, both rotors 37 and 38 and both field rings 41 (including the poles 40) are made of ferro-magnetic, non-retentive material.

Except for the projection 42, the outer radius or face of the pole 39 is slightly smaller than the inner arcuate face of the pole 40, so that when the rotor 37 is rotated clockwise in Fig. 4 to the position shown in phantom, only a small air gap exists between the opposed pole faces.

By virtue of this structure, when a magnetic flux is effected spanning the poles 39 and 40, the poles are attracted, and the rotor 37 is thus rotated clockwise until the stop member 42 abuts the side of the stator pole 40. In addition to acting as a stop member, the projection 42 serves as a magnetic anvil or portion which actually abuts or engages the counterpart magnetic portion, i. e., the stator pole 40, thus increasing the magnetic pull-in toward the end of the clockwise travel of the rotor 37.

The rotor 37 is biased counterclockwise (Fig. 4) by a torsion recovery spring 43 (Fig. 2), preferably non-magnetic, interposed between the two rotors 37 and 38. The spring 43 resides in a circular groove 44 formed in the inner face of the rotor 37 coaxially of the shaft 34 and in a similar corresponding groove 46 formed in the inner face of the rotor 38. The left end of the spring 43 is bent in an axial direction and projects into an anchor hole 47 formed in rotor 37, while the right end of the spring 43 is similarly anchored in a hole 48 in the rotor 38.

Radially inward of the groove 44, and also coaxial of the shaft 34, a counterbore is formed in the rotor 37, around the bore which forms the bearing on the shaft portion 36. This counterbore receives one half of a thrust bearing 49, preferably non-magnetic, the other half of which is received by a similar relief or counterbore in the rotor 38. The thrust bearing 49 is press fitted into the rotor 37, but clearance is left with respect to the rotor 38 so as to accommodate manufacturing tolerances of the parts involved.

By the structure described, it will be seen that the two rotors 37 and 38 are rotatively biased in opposite directions by means of the single recovery spring 43.

The grooves 44 and 46 are just wide enough to allow for the expansion and contraction of the spring 43 which takes place as the two rotors 37 and 38 turn oppositely with respect to each other. This rather close fit causes any vibration occurring in the spring 43 to bring the spring into engagement with the sides of the circular groove, thereby damping this vibration and allowing a spring structure to be employed even where adverse spring conditions are anticipated.

Returning now to Fig. 4, it will be seen that the rotor 37 is biased counterclockwise by the spring 43. In this position each projection 42 bears against a return stop 51 projecting axially inward and formed integral with a stop ring 52. The stops 51 are of arcuate shape, as shown in Figs. 1 and 4, and are backed up by the stator poles 40, so that the supporting ring 52 is not required to take any load but merely physically positions the stops 51. The stop ring 52, including its integral stops 51, is preferably made of a non-magnetic material in order to prevent magnetic sealing between the projection 42 and the stop and further to prevent the stop 51 from attracting the pole 39, thereby prohibiting the attractive force of the pole 40 from being brought into play when magnetic flux is applied to the rotor and stator. By providing several stops equally spaced around the periphery, the reactions at the bearing surfaces are minimized.

Coaxially circumjacent the rotors 37 and 38, electric coil means in the form of a coil 53 is mounted within the case 31. The coil 53 is carried within a spool 54 preferably made of non-magnetic material, such as stainless steel, and placed in the case from the left and stopped by an internal shoulder 60. Parts placed in from the right are stopped by a counterpart shoulder 65.

The gap between the rotors 37 and 38 is made as small as possible in order to minimize the reluctance introduced in the working flux path of the machine, and is determined by the recessing of the thrust bearing in the faces of the two rotors.

From the structure thus far described, it will be seen that whenever the coil 53 is energized through appropriate wires, one of which is shown at 55, an axial flux is established in the rotors 37 and 38 and in the case 31, with the flux path extending between the circumferentially spaced poles 39 and 40. This flux draws the poles together, thereby rotating the rotor 37 clockwise in Fig. 4. At the same time, the rotor 38 would be seen to be rotated counterclockwise (if it could be seen in Fig. 4). This is because, viewed from the respective ends of the case 31, the structures are essentially symmetrical.

Means are provided for coupling either the rotor 37 or the rotor 38 to shaft 34. If the rotor 37 is coupled to the shaft 34, then the shaft will rotate in a given direction whenever flux is applied through the coil 53. If on the other hand the rotor 38 is coupled to the shaft 34, the shaft will rotate in the opposite direction upon energization of the coil. This means for coupling the rotors 37 and 38 to the shaft 34 will now be described with reference to the rotor 37, the coupling means for the rotor 38 being essentially the same.

Figures 5, 6, 7, 8:
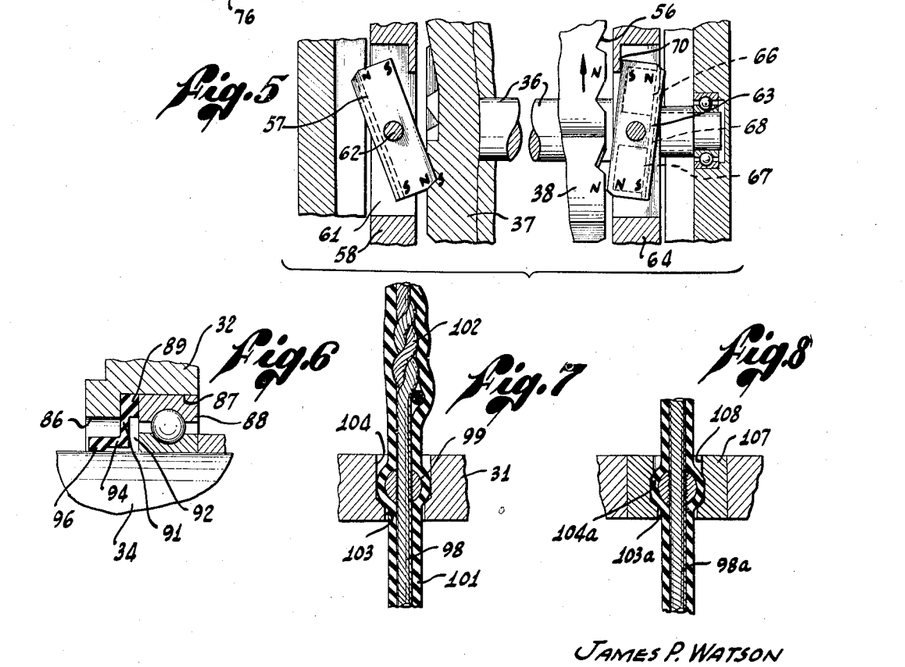
Fig. 5 is a fragmentary longitudinal section partially schematic, illustrating the operation and cooperation between the two rotors of the machine of Fig. 1.
Fig. 6 is a fragmentary section taken in the area 6 of Fig. 2.
Fig. 7 is a fragmentary section taken in the area 7 of Fig. 2.
Fig. 8 is a section similar to Fig. 7 showing a modification thereof.

Referring to Fig. 4, the outer face of the rotor 37 is provided with a plurality of grooves 56 forming ratchet teeth. These grooves are engaged by a pawl 57 attached to the shaft 34 through the intermediacy of a drive member or disc 58 keyed to the shaft by the squared portion 59 of the shaft 34. The pawl 57 resides in a slot 61 formed in the disc 58 and is pivoted about its midpoint by a pivot pin 62 passing therethrough. The pawl 57 is substantially identical to its counterpart pawl 63 pivoted in a drive disc 64 keyed to the other end of the shaft and cooperating with the rotor 38. Each pawl consists of a non-magnetic case containing a pair of magnets 66 and 67 linked together by a magnetic strap 68, which may also form a convenient case lid for enclosing the magnets 66 and 67 in suitable pockets formed in the case of the pawls 63. The magnets are polarized as shown in Fig. 5, in which the right hand pawl appears in front of the shaft 34 and the left hand pawl appears beyond or to the far side of the shaft 34.

This balanced arrangement about a central pivot eliminates turning moments that would otherwise be introduced by acceleration forces.

When the coil 53 is energized, the direction of the flux will depend upon the polarity of the current in the coil. In one case, the exposed face of the rotor 38 becomes a north pole while the exposed face of the rotor 37 becomes a south pole. The opposite condition prevails if the polarity of current in the coil 53 is reversed. Assuming that the coil has been energized to produce the polarity indicated in Fig. 5, it will be seen that the right hand pawl, i. e., the one cooperating with the rotor 38 has applied thereto magnetically a counterclockwise torque. This is because the bottom magnet 67 is repelled while the top magnet 66 is attracted. This magnetic torque brings the pawl 63 against a stop 70 formed integral with the drive disc 64 and extending into the slot in which the pawl 63 is mounted. Such a torque tends to force the operating end which is the lower end of the pawl 63 away from the ratchet teeth 69 formed in the face of the rotor 38, and in effect disengages the pawl 63 from the rotor 38.

At the other end of the machine the opposite is happening. There, the south polarity of the rotor 37 attracts the lower or operating end of the pawl 57 and pulls it more firmly into engagement with the ratchet teeth 56.

It will be observed at this point that when the machine is quiescent, i. e., when no current flows in the coil 53, so that the rotors 37 and 38 are biased against their respective non-magnetic stop members by the common torsion spring 43, the pawls 57 and 63 are so arranged with respect to their ratchet teeth that they are engaged with one of the teeth 56 and 69. This engagement is brought about by the normal magnetic attraction between the permanent magnet represented by the magnet 67 and the ferro-magnetic body constituting the rotor 38. Since the pawl stop 70 prevents magnet 66 from approaching as closely as magnet 67 to rotor 38, magnet 67 is always drawn to rotor 38 when coil 53 is de-energized. When the coil 53 is energized, the permanent magnetism is either enhanced as in the above cited example with respect to the pawl 57, or is overcome as in the example above given in connection with the pawl 63. Energization of the coil 53 disengages one of the rotors from the shaft 34 and simultaneously more firmly engages the other rotor with the shaft 34.

It will be noted in passing that in the quiescent position, the shaft cannot turn either way because both of the pawls 57 and 63 are engaged in their respective ratchet teeth and hence the shaft is locked or coupled to both rotors which are prevented from moving by their respective return stops 51.

When the coil 53 is energized and the appropriate pawl, for example the pawl 63, retracts from its ratchet tooth, both rotors are then freed to rotate in opposite directions, as noted, against the common bias of the spring 43. One of the rotors, in this case, the rotor 37, being coupled by the pawl 57 to the shaft 34 rotates the shaft 34 and any load connected thereto. The other rotor 38, however, is free of the shaft 34 and quickly rotates into energized position, illustrated by way of example by the phantom lines in Fig. 4. This produces a magnetic valving action, since the reluctance of the flux path is now greatly reduced by the juxtapositioning of the rotor 38 with the corresponding stator pole. This reduction in reluctance increases the flux across rotor poles 39 and stator poles 40.

Thus, effectively, in the major part of the operating range of the working rotor 37, there is only one air gap of consequence, namely the operating air gap between its own poles 39 and its corresponding stator poles 40, this in spite of the fact that there is available a balanced structure ready at all times to operate the shaft 34 in either direction in dependence upon the polarity applied to the coil 53.

Figure 3:
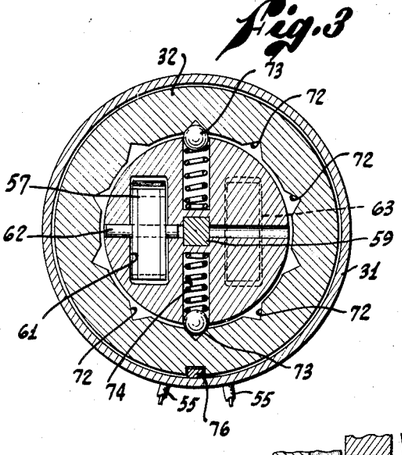
Fig. 3 is a cross section taken on line 3—3 in Fig. 2.

In order to insure proper engagement between the pawls 57 and 63 and their corresponding ratchet teeth in the respective rotors 37 and 38, means are provided for bringing the shaft 34 to rest at preselected positions during the quiescent status of the machine, i. e., during unenergization of the coil 53. In the present embodiment, this means comprises the formation of a plurality of interior detent notches 72 formed in the end bell 32 as shown in Fig. 3.

Cooperating with the notches 72 are a pair of spring pressed balls 73 riding in radial bores 74 formed in the drive disc 58. The spring pressed balls 73 operating in the notches 72 serve to inhibit the shaft 34 from being thrown by angular momentum beyond the position to which it is properly brought by each step of either the rotor 37 or the rotor 38. Thus upon return of the two rotors to relaxed position (brought about by the recovery spring 43), it is insured that there will be the proper relation between the shaft 34 and the rotors 37 and 38 to engage both of the pawls 57 and 63 with their respective ratchet teeth.

The several parts of the assembly are held in proper angular relation by a pair of elongate keys 76 formed with securing posts 77 which are pressed from the inside into small bores formed in the case 31.

It is a feature of the stepping motor machine illustrated in Fig. 1 that it is completely sealed against ingress and egress of liquids, gases or contaminants. This sealing feature readily adapts the motor to be interiorly pressurized if desired with an inert gas.

To effect such sealing it is necessary to seal the end bells 32 and 33 where they seat into the cylindrical case 31. This is done by means of O-rings 81. The end bells are held in place by means of snap rings 82, the outer faces of which are beveled as shown at 83 to engage in annular grooves 84 formed in the case 31. The resilience of the snap rings 82 keeps them constantly pressing outward into the groove 84 and the bevel at 83 transfers a portion of this force into an axial force tending to keep the parts of the machine axially pressed together in a tight fit.

Where the shaft 34 passes out of the end bell 32 a seal is provided around the shaft as shown in detail in Fig. 6. As shown therein, the opening in the end bell 32 consists of a bore 86 counterbored from the inside of the bell as shown at 87. Both bores are appreciably larger than the diameter of the shaft 34, so that appreciable clearance is left between the shaft and the opening. Into the counterbore 87 is fitted a ball bearing race 88 which serves as a journal member between the shaft 34 and the end bell 32. Pressed axially between the bearing 88 and the shoulder formed between the bores 86 and 87 is a pliant sealing member 89 having an annular portion 91 disposed in a plane substantially normal to the axis of the shaft 34. The outer periphery of the annular portion 91 is enlarged in an axial direction as shown to provide a clearance space 92 between the bearing 88 and the portion 91. This allows the inner portion of 91 to flex axially as will be described hereinafter.

The inner periphery of the portion 91 is spaced from the shaft 34 as shown at 93.

The sealing member 89 is also provided with a tubular portion 94 integrally joined to the annular portion 91 at the inner periphery thereof. The thickness of the tubular portion 94 is inwardly enlarged at its end 96 so that it bears firmly and resiliently against the shaft 34. The unstressed inner diameter of the portion 96 is made slightly smaller than the diameter of the shaft, so that the stretching of the member 89 provides a seal around the shaft.

In spite of the most precise fabrication, the shaft 34 may tend to whip eccentrically in the bore 86. The sealing member 89 by its construction gives way with this whipping, while still retaining a tight seal at 96. Thus when the shaft 34 whips slightly out of its proper circumference, both the tubular portion 94 and the annular portion 91 are free to flex slightly, employing the resiliency and pliancy of the material from which the sealing member 89 is made. During this flexing, it will be seen that the clearances provided prevent undue frictional wear between the shaft and the rubbing surface at 96 and at the same time do not detract in any way from the tight seal effected around the shaft 34 at 96.

Another place where sealing must be provided is where the two leads 55 for the coil 53 pass out of the case 31. This is done as shown in Fig. 7. In this figure one of the conductors leading into the coil 53 is shown as a stranded, twisted wire 98. In accordance with the present invention, an enlargement 99 is affixed to the wire 98. This enlargement is preferably formed by soldering or brazing a ball of metal. Since the conductor 98 is stranded, it is preferred in the soldering or brazing operation to flow the molten metal into the interstices between the strands of the wire 98 and bond the metal to these strands so that fluid cannot pass axially along the wire 98, being barred at the point of the enlargement 99.

Over the wire 98 and the enlargement 99 is slipped a tube of pliant, resilient insulation 101. It is a feature of the present invention that this structure readily lends itself to allowing the insulating tube 101 to be slipped also over a joint 102 formed between the wire 98 and the terminal wire of the coil 53.

Where the wire passes through the case 31, the wall of the case is bored as shown at 103 and is counterbored from the inside of the case as shown at 104. The outer diameter of the enlargement 99 is slightly larger than the diameter of the bore 103. The diameter of the counterbore 104 is slightly smaller than the outer diameter of the insulating tube 101 where it expands and passes outwardly around the enlargement 99.

With a structure thus described, the wire 98 is passed outwardly through the bore 103 and then on further outward pulling, the enlargement 99 is drawn firmly into the counterbore 104, the pliancy and resiliency of the insulation 101 providing a tight seal between the case 31 and the enlargement 99 in the area where the counterbore 104 surrounds 99. The relative size of the parts prevents the wire 98 from being further pulled outward of the case 31.

Figure 2:
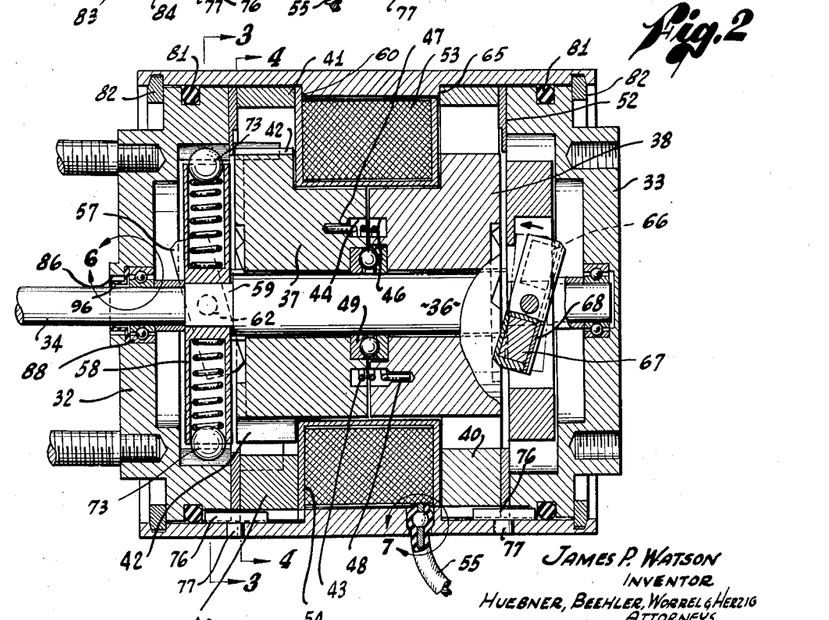
Fig. 2 is a longitudinal section of the machine shown in Fig. 1.

The physical presence of the coil 53 prevents movement of the wire inward, as shown in Figs. 1 and 2 thereby retaining the seal between the case and the wire.

In case difficulty is experienced in making the internal counterbore 104, a portion of the casing wall 31 through which the wire passes may be made as a separate insert 107 shown in Fig. 8.

With the structure shown in Fig. 8, the counterbore 104a may be readily formed in the insert 107, which is then pressed into the case 31 either from the outside or the inside, as desired, the wire 98a then being drawn into the bore in the manner described above in connection with Fig. 7.

Fig. 8 also illustrates a modified feature which may be employed with either the insert type of bore shown in Fig. 8 or the integral type shown in Fig. 7. This feature involves an ensmallment of the counter bore 104a as shown at 108. As the wire 98 is pulled through the bore 103a, when the enlargement encounters the bore 108 it is necessary to pull forcefully to cause the enlargement to enter into that portion of the bore having the maximum diameter. It is held there in a sort of pocket with further outward pulling being prevented by the bore 103a and with inward pulling being inhibited by the bore 108.

All parts of the magnetic path of the motor shown in Fig. 1 are made of a material which has very low retentivity, that is, a material which de-magnetizes quickly upon removal of the energizing field from the coil 53. These parts are the rotors 37 and 38, the two field rings 41 carrying the stator pole 40, and the stator housing or case 31. The magnets in the pawls 57 and 63, on the other hand, are made of a highly retentive magnetic material.

It will be noted that the pawls 57 and 63 are balanced so that acceleration forces have no effect on their operation.

Provision of two balls 73 cooperating with the detent notches 72 provides a balanced structure which does not malfunction under high acceleration forces. Downward acceleration in Fig. 3 tends to reduce the force of the lower ball but it correspondingly increases the force at the upper ball, and thereby the locking action of the total detent mechanism remains substantially the same.

Figure 9:
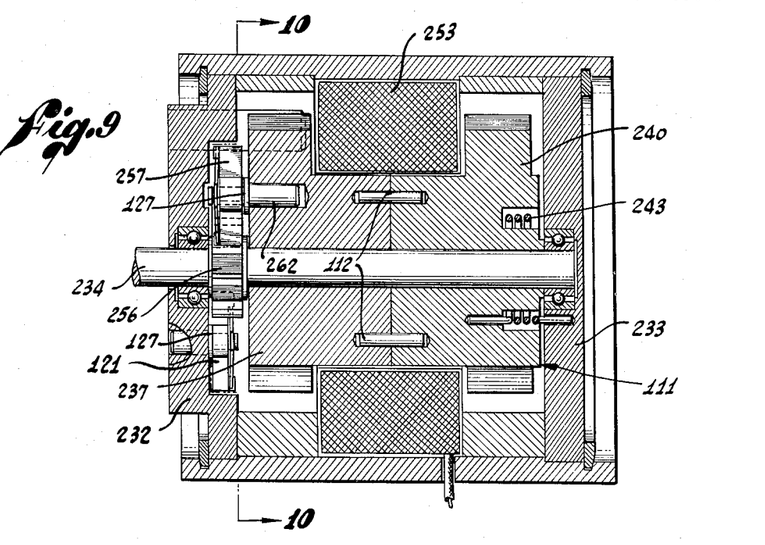
Fig. 9 is a longitudinal section of an oscillating electromagnetic machine forming another embodiment of the present invention.

Turning now to Figs. 9–14, there is shown a modification of the present invention, this being a stepping motor in which the shaft 234 is operated in only one direction and intermittently by the oscillatory action of a rotor 111. The motor shown in Fig. 9 is characterized particularly by a form of biased pawl 257 which is extremely simple in fabrication and assembly and which is balanced against accelerative forces.

The rotor 111 is formed in two parts 237 and 240, which are pinned together at the center by means of pins 112. The rotor 111 is biased counterclockwise (Fig. 10) by means of a torsion spring 243 operatively connected between the rotor 111 and the end bell 233 of the stepping motor. Each of the two rotor parts 237 and 240 is provided at the extremities of the rotor with rotor poles, as shown at 238 in Fig. 10.

As in the stepping motor shown in Fig. 1, the rotor 111 is journaled rotatively on the central portion of the shaft 234. The shaft 234 has pinned thereto a ratchet wheel 256, on which rides the drive pawl 257, which is pivoted to the rotor 111 by a pin 262 pressed into the rotor.

Both the shaft 234 and the ratchet wheel 256 are non-magnetic.

In accordance with the present invention, and particularly as shown in Figs. 11–14, the pawl 257 is of balanced construction. It is held on to the pivot pin 262 by a single elongate spring wire 113 which also serves as a biasing means for keeping one end of the pawl in proper engagement with the ratchet wheel 256.

Figures 10, 11, 12, 13, 14:
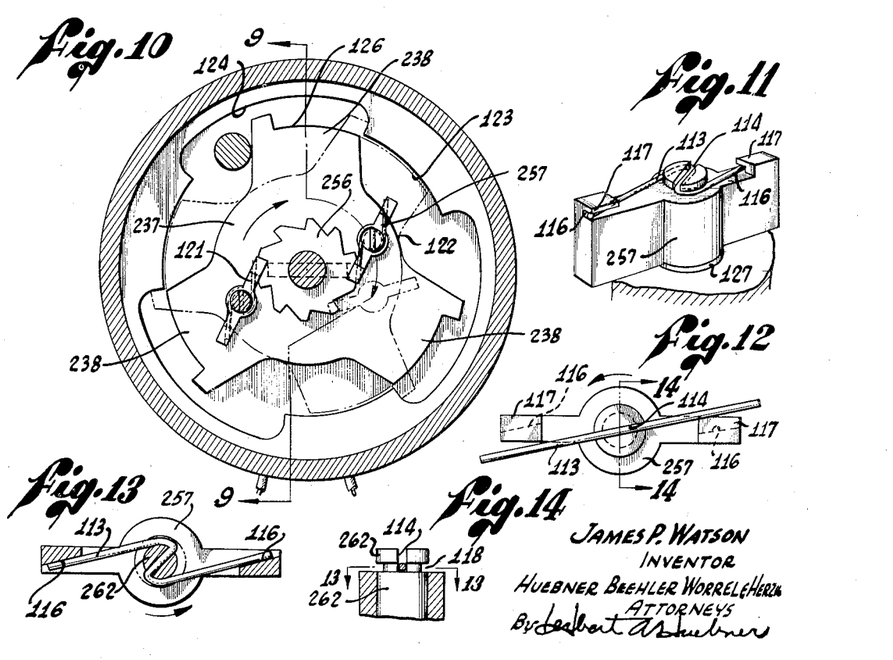
Fig. 10 is a cross section taken on line 10—10 in Fig. 9.
Fig. 11 is a fragmentary perspective view of a pawl member employed in the machine of Figs. 9 and 10.
Fig. 12 is an axial view of the pawl of Fig. 11.
Fig. 13 is a cross section of the pawl taken on line 13—13 in Fig. 14.
Fig. 14 is a fragmentary section taken on line 14—14 in Fig. 12.

In accordance with the present invention, the pivot pin 262 is provided with a diametral passageway, in this particular instance being shown as a diametric kerf 114 formed in the head of the pin 262. The wire spring 113 resides in the kerf 114 as shown in Fig. 11, and each end is turned back and then retained in a pocket 116 bordered by a projecting ledge 117 formed laterally on the end of the pawl 257. The passageway may be a diametral bore through the pin 262, in which case no further structural requirements are needed to complete the assembly. Where the passageway is a kerf 114 as shown, however, other means are provided for preventing the pawl 257 from coming off of the end of the pivot pin 262. This means comprises a circumferential groove 118 which communicates with the ends of the kerf 114 and which receives the turned back portion of the spring 113, as best seen in Figs. 11 and 13.

Assembly of the pawl and spring shown in Figs. 11–14 is extremely simple. First the spring is placed in the kerf as shown in Fig. 12. The pawl 257 is then turned counterclockwise in Fig. 12, first to bring the ends of the wire 113 into the pockets 116, and then to bend the wire around to the position shown in Fig. 13, where it resides in the retaining groove 118. During this operation the spring is bent and the normal resilience of the spring tends to bias it clockwise.

At this point the ratchet wheel 256 is interposed as shown in Fig. 10 with one end of the pawl being strongly biased against the ratchet teeth by the resilience of the spring 113. It will be noted in Fig. 12 that initially the ends of the spring 113 extend well beyond the ends of the pawl 257. This is to provide for the length of spring needed to wrap around pin 262, and in this operation the spring slides in the pockets 116 until the final position shown in Fig. 13 is attained.

The pawl shown in Figs. 11–14 is completely balanced against accelerative forces as is the spring 113. Thus, referring to Fig. 13, an accelerative force which tends to move the spring upward weakens the force of the right hand end of the spring, but it correspondingly strengthens the force of the left hand end of the spring, so that the aggregate torque asserted by the spring 113 on the pawl 257 remains substantially constant in spite of high acceleration. The pawl 257 itself is balanced innately by the fact that the pivot pin 262 passes directly through the center thereof.

A similar retaining pawl 121 is pivoted to the end bell 232 and serves to prevent the shaft 234 from backing up as the rotor is returned under the influence of its recovery spring 243. The second pawl 121 also serves in detent fashion to hold the shaft 234 in proper position to receive the next stroke from the driving pawl 257.

As shown in Fig. 9 the retaining pawl 121 need not be as wide as the drive pawl 257, because it is not subjected to the high impact forces of the driving rotor 111 upon each magnetizing pulse of the energizing coil 253.

As best seen in Fig. 10, the radial distance from the face of the rotor proper shown at 122 to the face of the stator pole shown at 123 is approximately the same as the distance from the large diameter of the stator shown at 124 to the outer face of the rotor pole 126. This tends to equalize the leakage paths from rotor to stator at the start of operation of the rotor 111, and thus minimizes the total magnetic leakage.

Both of the pawls 257 and 121 are spaced from their respective bases by spacing washers 127 which serve to minimize pivoting friction.

Figure 15:
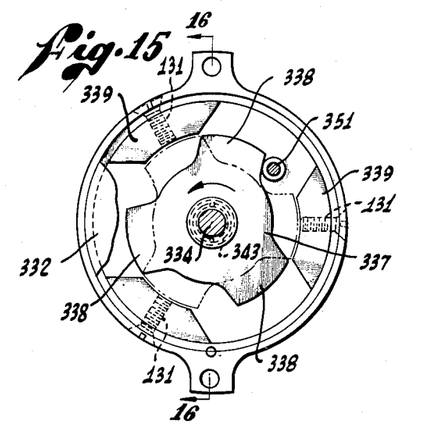
Fig. 15 is an end view of an oscillating electromagnetic machine constituting another embodiment of the present invention and illustrated with the end plate removed.
Figure 16:
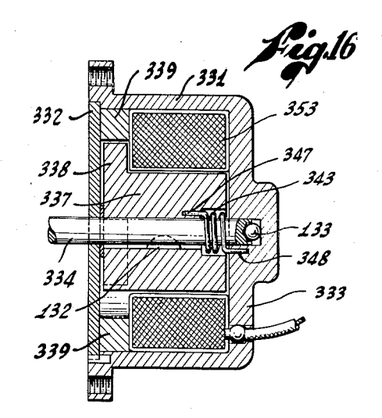
Fig. 16 is a longitudinal section taken on line 16—16 in Fig. 15.

Another modification of the present invention is illustrated in Figs. 15 and 16. In these figures the stator 331 has attached therein by means of screws 131 three internally extending stator poles 339. These poles cooperate with the corresponding three poles 338 of a rotor 337. The rotor 337 is keyed by a key 132 to a shaft 334, one end of which projects through the cover plate 332, the other end of which bears against a ball 133 constituting a thrust bearing. The rotor 337 is biased clockwise (Fig. 15) against a non-magnetic stop 351, by means of a torsion return spring 343, one end of which is secured at 348 to the case 331, the other end being secured at 347 to the rotor 337.

The machine shown in Figs. 15 and 16 is the simplest of the several embodiments illustrated, and merely oscillates the shaft 334 back and forth in response to each pulse applied to the coaxial coil 353.

Upon energization of the coil 353, flux is produced axially in the rotor 337 and case 331, and radially in the right hand end or end bell 333 of the case 331. At the left end of the machine (Fig. 16) the flux links the poles 338 and 339 thereby rotating the rotor 337 in a counter-clockwise direction (Fig. 15). This modification of the present invention is not provided with a stop in the operating direction similar to the stop formed by the projection 42 of Fig. 4, but such may be provided if desired.

A continuously running machine is shown in Figs. 17–21. In this embodiment, the rotor 411 is provided at one end with a pair of opposed salient poles 134, and the other end with a pair of opposed salient poles 438. The rotor is split longitudinally, as shown at 136, between the poles 134, so that by virtue of the resilience of the metal of which the rotor 411 is made, the poles 134 may be sprung outward slightly. The rotor 411 extends outwardly beyond the poles 134 to form a pair of clutch portions (one on each side of the split 136) denoted by the numeral 137. The clutch portions 137 ride just inside the flange of a cupped shaped clutch member 138 which is formed integral with the shaft 434 of the machine.

As in the modifications previously described, the rotor 411 is journaled on the shaft 434, being free to rotate thereon, except when clutched thereto.

When current is applied to the coaxial coil 453 the magnetic flux between the rotor and the stator poles tends to open the splits 136 slightly, thereby bringing the portions 137 into frictional engagement with the cup shaped clutch member 138, and thus the rotor 411 is clutched to the shaft 434. As the rotor speeds up this clutching action, effected through the pull of the magnetic flux on the poles 134, is enhanced by the centrifugal force, which also tends to separate the pole pieces 134 and drive parts 137 into firmer engagement with the clutch member 138.

Figures 17, 18, 19, 20, 21:
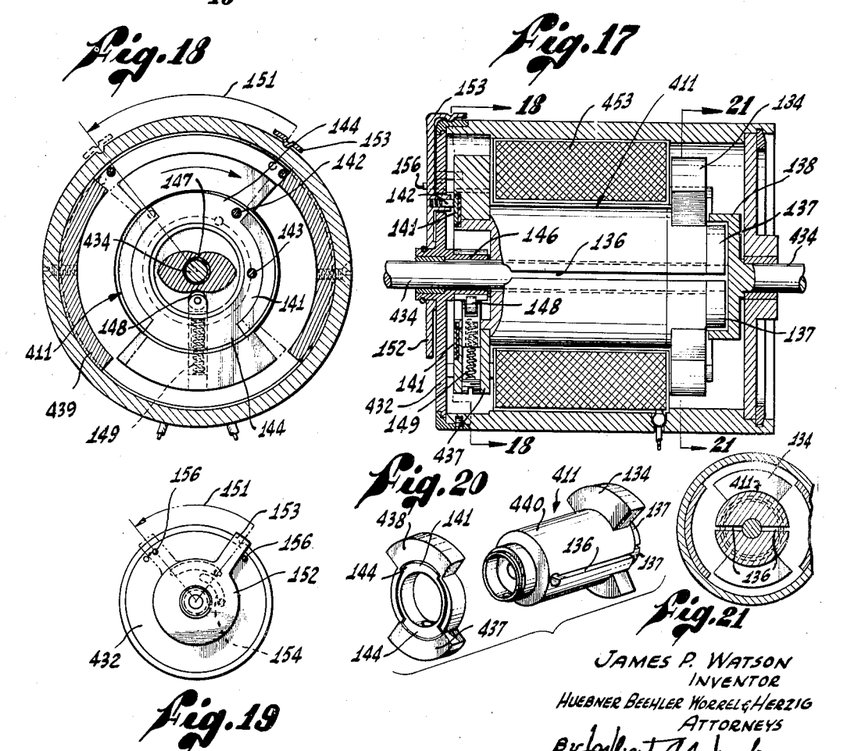
Fig. 17 is a longitudinal section of another form of the present invention.
Fig. 18 is a cross section taken on line 18—18 in Fig. 17.
Fig. 19 is an end view illustrating certain features of operation of the machine shown in Fig. 17.
Fig. 20 is an exploded perspective view of the rotor of the machine in Fig. 17.
Fig. 21 is a cross section (reduced) taken on line 21—21 in Fig. 17.

For ease of construction the rotor 411 is made in two parts 440 and 437, as shown in Fig. 20.

As noted hereinbefore, the machine of Fig. 17 is a continuously rotating machine. This is effected by arranging switch means in the circuit of the coil 453 which intermittently opens and closes the circuit to the coil 453. The switch means is so arranged that the coil is energized when the rotor and stator poles are separated, and then as the poles are drawn into juxtaposition, the circuit is broken, allowing the rotational momentum to continue to rotate the rotor until the poles are in position to be attracted by the opposite stator poles, at which time the circuit is re-made.

In Fig. 17 this circuit means is provided by placing an annular slip ring 141 embedded in the face of the rotor part 437 and mounting a pair of brushes 142 and 143 in the end plate 432, which closes the left hand end of the machine. The brush 143 rides continuously against the slip ring 141 whereas the brush 142 rides against the slip ring 141 only during two portions of the revolution, by virtue of the salient portions 144 formed on the ring 141. In between, the brush 142 simply slides against the insulation mounted in the outer face of the rotor part 437, in which the ring 141 is embedded.

Figure 24:
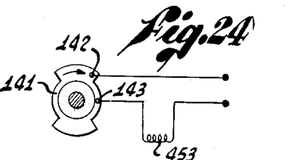
Figs. 24 and 25 are alternate wiring diagrams illustrating methods of connecting the electrical portions of the machine shown in Fig. 17.

The annular slip ring is insulated from the rotor 437, and the brushes 142 and 143 are insulated from the end plate 432. The electrical circuitry is shown schematically in Fig. 24, wherein it will be readily seen that as the rotor rotates, there are two portions of each revolution when the circuit is completed to the coil 453, and two portions when the circuit is broken. The brushes and slip ring are so arranged that the coil is energized when the pole pieces 438 and 134 are spaced from the stator poles 439.

In order to insure that the rotor will always come to rest in proper position to be started in its desired direction, the end plate 432 is provided with an inwardly projecting hub 146 which carries a double pointed cam 147. Against the cam 147 rides a roller 148, which is mounted for radial movement in the rotor part 437 and pressed inwardly against the cam by a bias spring 149. Thus no matter where the rotor might normally tend to come to rest, the roller 148 bearing against the cam 147 cams the rotor into one of two positions, these positions being such that upon re-energization of the coil 453 the rotor will start to rotate in the desired direction. From there on, the intermittent opening and closing of the circuits through the brush 142 keeps it rotating in the same direction. This positioning of the rotor by the cam 147 is so arranged that the pole pieces 438 and 134 are slightly closer to one edge of the stator poles than they are to the other, thus insuring that the rotor will start up in the right direction.

In order to reverse rotation, the brushes 142 and 143 are shifted arcuately as shown by the arrowed line 151. This shifting is effected by mounting the brushes 142 and 143 not actually on the end plate 432 but instead on a circular plate 152 which may be angularly adjusted with respect to the end plate 432 by means of a radial arm 153. To this end the brushes 142 and 143 project through respective arcuate slots 154 in the cover plate 432. Mounting of brush 143 on plate 152, so that it shifts therewith, is not necessary to the reversal of direction, but is a structural convenience to avoid building the reversing structure around the brush 143.

Reversal of the motor direction requires that the position of the cam 147 also be shifted slightly, and this is done by providing a pair of pins 156 in the cover plate 432 which are engaged and pushed slightly by the arm 153 toward the extremities of each of its two adjustment directions, as shown in Fig. 19. Thus the slight arcuate shifting of the cover plate 432 shifts the cam 147 the desired amount to bring about the proper re-positioning of the rotor with respect to the stator in order to reverse direction of rotation.

While the clutch illustrated at 137 and 138 may be omitted if desired, it is preferable to include some means for de-coupling the rotor from the output shaft in order that the spring pressed positioning follower 148 might not be required to position the entire load to which the shaft 434 is connected but need position only the rotor itself. Where the load is extremely light, it is possible to couple the shaft 434 directly to the rotor 411 by keying or other well known means.

It will be noticed that the cam arrangement 147 and 148 for positioning the rotor after de-energization of the coil 453 is so arranged that the radially movable roller 148 is mounted in the rotor. In this manner, as the motor comes up to speed, the roller 148 is thrown outward by centrifugal force and does not touch the cam 147. This eliminates the intermittent contact and consequent possible jerking action which would otherwise result and also minimizes wear between the cam 147 and the roller 148.

Figures 22, 23:
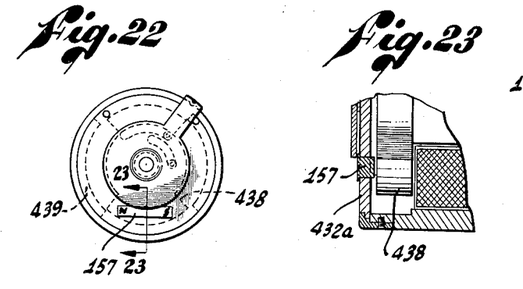
Fig. 22 is a view generally similar to Fig. 19 showing an alternative modification of the machine of Fig. 17.
Fig. 23 is a view taken on line 23—23 in Fig. 22.

If desired, magnetic means may replace the cam means for positioning the rotor during quiescent periods. Such a means is shown in Figs. 22 and 23, wherein a permanent magnet 157 is mounted in the end plate 432a of the stator and disposed in a generally tangential attitude. The poles of the magnet 157 co-act with the salient poles 438 of the rotor 411 to position the rotor in one of two predetermined positions as the rotor slows down and comes to rest. As in the modification shown in Fig. 17 the magnet 157 is shifted slightly just as the cam 147 was shifted, whenever the arm 153 is pivoted to reverse the direction of rotation.

Figure 25:
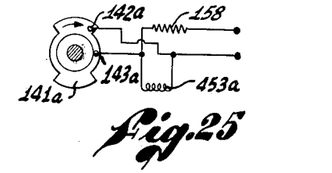

In Fig. 25 there is shown an alternative wiring arrangement for the motor wherein the problem of arcing between the brush 142 and the annular slip ring 141 is greatly minimized. In this diagram the coil 453a is permanently connected to a source of power through a series resistor 158. The brushes 142a and 143a are a part of a circuit which shunts out the coil 453a, thereby in effect de-energizing the machine and demagnetizing the rotor 411. Thus the magnetic effect of the two circuits shown in Figs. 24 and 25 respectively is substantially the same, but the breaking of contact between the brush 142a and the slip ring 141a, instead of opening a highly inductive circuit, merely removes a short circuit from across the coil 453 and allows the current to flow through the coil 453a. The result is that arcing at the brush 142a is substantially eliminated.

When the circuit is closed through the annular slip ring 141a the energy which is inductively stored in the coil 453a dissipates through the slip ring 141a. However, since the brushes 142a and 143a are in closed circuit position, they are much more able to withstand the heavy current than would be the case were they opening rather than closing.

Figure 26:
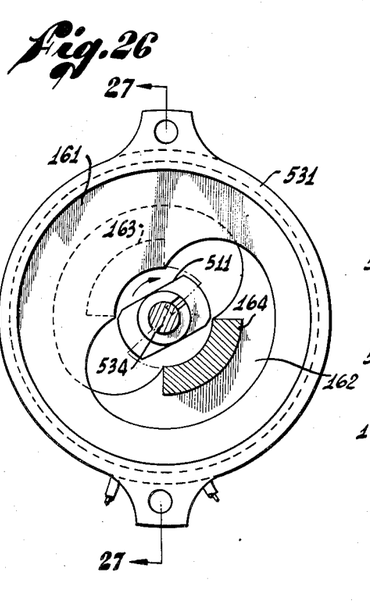
Fig. 26 is an end view of another form of the present invention taken with the end bell or plate removed, along line 26—26 in Fig. 27.
Figure 27:
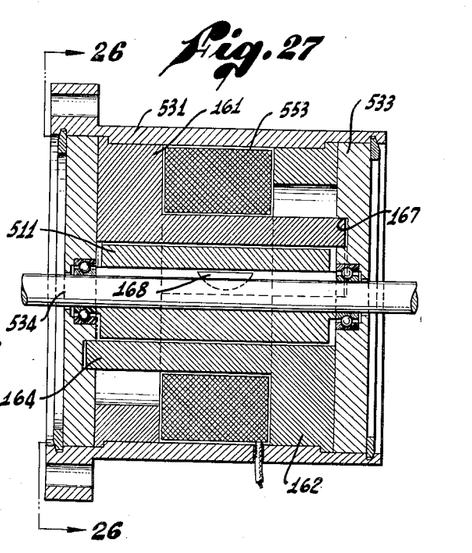
Fig. 27 is a longitudinal section taken on line 27—27 in Fig. 26.
Figure 28:
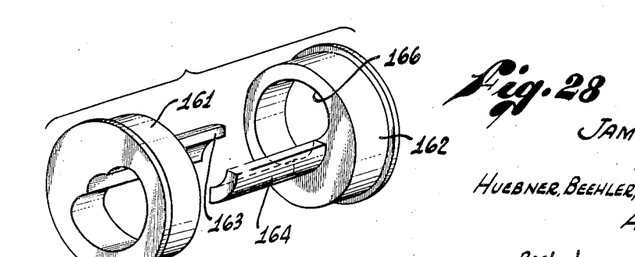
Fig. 28 is an exploded perspective view of the stator poles of the machine shown in Fig. 27.

Another form of the present invention is illustrated in Figs. 26-28, wherein the machine is shown as comprising a stator consisting of a case 531 made of ferro-magnetic, non-retentive material and a pair of opposed stator pole pieces 161 and 162 provided with respectively opposed longitudinally extending arcuate stator poles 163 and 164. The end of each pole, for example the pole 163, extends through a large clearance opening 166 formed in the opposite stator 162, and is supported in an arcuate groove 167 formed on the interior face of the non-magnetic end plate 533. The pole 164 is similarly arranged at the opposite end of the machine.

Disposed between the poles 163 and 164 is a rotor 511 keyed at 168 to the shaft 534 journaled in and passing through the non-magnetic end plates. The rotor 511 is in the shape of a flattened cylinder as shown in Fig. 26 so that in one position it forms the best magnetic path between the opposed faces of the poles 163 and 164, while in a position 90° displaced therefrom, it forms the poorest magnetic path.

Coaxially circumjacent the stator poles 163 and 164 is the energizing coil 553, which serves to effect a magnetic flux axially in the stator poles 163 and 164 and in the case 531.

Because the two stator poles 163 and 164 are magnetically open circuited, the flux path must extend diametrically across the machine between the poles 163 and 164. This creates a magnetic field tending to draw the rotor 511 into a position directly spanning the two poles. In this way, energization of the coil 553 causes rotation of the rotor 511 and shaft 534.

Any suitable means is provided for intermittently making and breaking the circuit of the coil 553 to produce the result discussed hereinbefore in connection with Fig. 17. Thus the coil 553 is intermittently energized to rotate the rotor 511 toward alignment with the poles and then the circuit is opened allowing the momentum of the rotor to carry it around until it is ready to be drawn again toward the poles by re-energization of the coil 553.

As in the embodiment shown in Fig. 17, it is preferred to provide suitable means for declutching or uncoupling the shaft 534 from its load when the power is turned off.

Means should also be provided along the lines indicated in Fig. 17 for positioning the rotor 511 as it comes to rest following de-energization of the coil 553 in order to properly position it for starting in the proper direction when the coil 553 is re-energized.

Reversal of shaft rotation may be effected as in Fig. 17.

Except for the machine having the polarized pawls, Figs. 1-5, all embodiments shown herein operate on either A. C. or D. C.

While the instant invention has been shown and described herein in what are conceived to be the most practical and preferred embodiments, it is recognized that departures may be made therefrom within the scope of the invention which is therefore not to be limited to the details disclosed herein, but is to be accorded the full scope of the claims.

What is claimed is:

1. Oscillating machine comprising stator means having at least one magnetic pole, a shaft rotatably mounted in said stator means, rotor means rotatably mounted coaxially circumjacent said shaft and having at least one pole, said poles being mutually circumferentially attracted to each other upon effecting of a magnetic field therebetween, electric coil means mounted coaxially circumjacent said rotor means for effecting an axial magnetic flux in said rotor means, said flux spanning the gap between said poles, whereby upon energization of said coil means said poles are attracted, thereby to effect rotation of said rotor means and permanent magnet means cooperating with said flux for coupling said rotor means to said shaft.

2. Rotating mechanism comprising stator means, a shaft rotatably mounted in said stator means, rotor means rotatably mounted coaxially circumjacent said shaft, means for selectively coupling said shaft and rotor means and comprising a pair of elements, one of said elements being a pawl, and the other being a toothed member coaxially mounted with respect to said shaft, one of said elements being coupled to said shaft, the other being coupled to said rotor means, at least one of said elements being magnetically polarized, and means for effecting a magnetic field between said elements to selectively engage or disengage said elements, thereby to couple said shaft and rotor means together.

3. Oscillating electric machine comprising stator means having at least one magnetic pole, a shaft rotatably mounted in said stator means, rotor means rotatably mounted coaxially circumjacent said shaft and having at least one pole, said poles being mutually circumferentially attracted to each other upon effecting of a magnetic field therebetween, electric coil means mounted coaxially circumjacent said rotor means for effecting an axial magnetic flux in said rotor means, said flux spanning the gap between said poles whereby upon energization of said coil means said poles are attracted, thereby to effect rotation of said rotor means, and coupling means including a pair of elements, one being a pawl, and the other being a cooperating rotary member, one of said elements being coupled to said shaft, the other being coupled to said rotor means, at least a portion of one of said elements being magnetically polarized, whereby energization of said coil means to effect axial magnetization of said rotor means serves to selectively effect engagement of said elements.

4. Oscillating machine comprising a rotatably mounted shaft, a pawl pivoted to said shaft, a rotor rotatably mounted coaxially circumjacent said shaft, said rotor having ratchet teeth formed in a face thereof generally normal to said shaft, said pawl being permanently magnetized so that one end constitutes a north pole and the other end constitutes a south pole, said rotor being formed of paramagnetic material to attract or repel said pawl when appropriately magnetized, and electromagnetic means for magnetizing said rotor to selectively attract or repel said pawl.

5. Oscillating electric machine comprising stator means having at least one magnetic pole, a shaft rotatably mounted in said stator means, rotor means rotatably mounted coaxially circumjacent said shaft and having at least one pole, said poles being mutually circumferentially attracted to each other upon effecting of a magnetic field therebetween, electric coil means mounted coaxially circumjacent said rotor means for effecting an axial magnetic flux in said rotor means, said flux spanning the gap between said poles, whereby upon energization of said coil means said poles are attracted, thereby to effect rotation of said rotor, and coupling means including a pair of elements, one being a rotary toothed member, the other being a pawl engageable therewith; one of said elements being coupled to said shaft, the other being coupled to said rotor means, at least a portion of one of said elements being permanently magnetized with a given polarity, whereby energization of said coil means to effect axial magnetization of said rotor means serves to selectively effect engagement of said elements.

6. Oscillating machine comprising stator means having at least one magnetic pole, a shaft rotatably mounted in said stator means, rotor means rotatably mounted coaxially circumjacent said shaft and having at least one pole circumferentially spaced from said pole of said stator means, said poles being mutually circumferentially attracted to each other upon effecting of a magnetic field therebetween, electric coil means mounted coaxially circumjacent said rotor means for effecting axial magnetic flux in said rotor means, said flux spanning the gap between said poles, whereby upon energization of said coil means said poles are attracted, thereby to effect rotation of said rotor means, and coupling means including a pair of elements, one being a pawl, and the other being a cooperating toothed member, one of said elements being coupled to said shaft, the other being coupled to said rotor means; the portion of said pawl which engages said toothed member having therein a permanent magnetic polarity, whereby energization of said coil means to effect axial magnetization of said rotor means serves to selectively effect engagement or disengagement of said elements.

7. Oscillating machine comprising stator means having at least one magnetic pole, a shaft rotatably mounted in said stator means, rotor means rotatably mounted coaxially circumjacent said shaft and having at least one pole circumferentially spaced from said pole of said stator means, said poles being mutually circumferentially attracted to each other upon effecting of a magnetic field therebetween, electric coil means mounted coaxially circumjacent said rotor means for effecting axial magnetic flux in said rotor means, said flux spanning the gap between said poles, whereby upon energization of said coil means said poles are attracted, thereby to effect rotation of said rotor means, and coupling means including a pair of elements, one being a pawl pivoted in the middle, the extremities of said pawl having opposite polarities, and the other being a cooperating toothed member, one of said elements being coupled to said shaft, the other being coupled to said rotor means, whereby energization of said coil means to effect axial magnetization of said rotor means attracts one end of said pawl and simultaneously repels the other, thereby effecting balanced torque about the pivot, selectively effecting engagement or disengagement of said elements.

8. Oscillating machine comprising a stator having a radially inward projecting pole with an arcuate pole face, a rotor rotatably mounted in said stator and having a radially outward projecting pole with an arcuate pole face cooperating with said stator pole face, means for effecting a magnetic field between said poles, thereby to attract said poles and effect rotation of said rotor with respect to said stator, one of said poles having a projection formed thereon with a substantially radial face extending across the path of relative rotation between said poles, the other of said poles having a substantially radial face complementary to and engageable with said first mentioned substantially radial face, thereby forming radial abutment means which limit oscillation of said rotor in one direction, cooperation of said substantially radial faces serving to enhance the magnetic pull-in between said poles at the end of the oscillation of said rotor with respect to said stator.

9. Oscillating machine comprising a stator having a radially inward projecting pole with an arcuate pole face, a rotor rotatably mounted in said stator and having a radially outward projecting pole with an arcuate pole face cooperating with said stator pole face, means for effecting a magnetic field between said poles, thereby to attract said poles and effect rotation of said rotor with respect to said stator, one of said poles having a projection formed thereon with a substantially radial face extending across the path of relative rotation between said poles, the other of said poles having a substantially radial face complementary to and engageable with said first mentioned substantially radial face, thereby forming radial abutment means which limit oscillation of said rotor in one direction, cooperation of said substantially radial faces serving to enhance the magnetic pull-in between said poles at the end of the oscillation of said rotor with respect to said stator, and at least one non-magnetic stop member interacting between said rotor and stator to limit oscillation in the other direction and reduce magnetic pull in said other direction.

10. Oscillating electric machine comprising frame means, rotor means rotatably mounted in said frame means to rotate about a given axis, electric coil means mounted in said frame means coaxially circumjacent said rotor means, said rotor means extending axially beyond at least one end of said coil means, rotor pole means extending radially outward from said axially extending portion of said rotor means and terminating in a substantially coaxial arcuate face disposed at a radius lying between the inner and outer radii of said coil means, and stator pole means extending radially inward from said frame means and terminating in a substantially coaxial arcuate face disposed at a radius slightly greater than that of said rotor pole means and having the same axial position as said rotor pole means, said rotor pole means and said stator pole means having portions with radially disposed respective interengaging faces which form stop means limiting oscillation of said rotor means in one direction, and also constitute magnetic anvil means increasing the magnetic pull in between said pole means at the end of the oscillation in said direction.

11. Oscillating electric machine comprising frame means, rotor means rotatably mounted in said frame means to rotate about a given axis, electric coil means mounted in said frame means coaxially circumjacent said rotor means, said rotor means extending axially beyond at least one end of said coil means, rotor pole means extending radially outward from said axially extending portion of said rotor means and terminating in a substantially coaxial arcuate face disposed at a radius lying between the inner and outer radii of said coil means, stator pole means extending radially inward from said frame means and terminating in a substantially coaxial arcuate face disposed at a radius slightly greater than that of said rotor pole means and having the same axial position as said rotor pole means and coaxial torsion spring means for rotatably biasing said rotor means in said frame means.

12. Oscillating electric machine comprising frame means, a shaft journaled ˙ said frame means, rotor means rotatably mounted in said frame means to rotate coaxially about said shaft, electric coil means mounted in said frame means coaxially circumjacent said rotor means, said rotor means extending axially beyond at least one end of said coil means, rotor pole means extending radially outward from said axially extending portion of said rotor means and terminating in a substantially coaxial arcuate face disposed at a radius lying between the inner and outer radii of said coil means, stator pole means extending radially inward from said frame means and terminating in a substantially coaxial arcuate face disposed at a radius slightly greater than that of said rotor pole means and having the same axial position as said rotor pole means, and means for selectively coupling said rotor means to said shaft.

13. Oscillating electric machine comprising frame means, a shaft journaled in said frame means, rotor means rotatably mounted in said frame means to rotate coaxially about said shaft, electric coil means mounted in said frame means coaxially circumjacent said rotor means, said rotor means extending axially beyond at least one end of said coil means, rotor pole means extending radially outward from said axially extending portion of said rotor means and terminating in a substantially coaxial arcuate face disposed at a radius lying between the inner and outer radii of said coil means, stator pole means extending radially inward from said frame means and terminating in a substantially coaxial arcuate face disposed at a radius slightly greater than that of said rotor pole means, and having the same axial position as said rotor pole means, and pawl and toothed wheel means for selectively linking said rotor means and said shaft.

14. Oscillating electric machine comprising frame means, a shaft journaled in said frame means, rotor means rotatably mounted in said frame means to rotate coaxially about said shaft, electric coil means mounted in said frame means coaxially circumjacent said rotor means, said rotor means extending axially beyond at least one end of said coil means, rotor pole means extending radially outward from said axially extending portion of said rotor means and terminating in a substantially coaxial arcuate face disposed at a radius lying between the inner and outer radii of said coil means, stator pole means extending radially inward from said frame means and terminating in a substantially coaxial arcuate face disposed at a radius slightly greater than that of said rotor pole means and having the same axial position as said rotor pole means, and rotary toothed means mounted coaxially of said rotor means, and rotatably mounted pawl means engageable with said toothed means for selectively coupling said rotor means to said shaft.

15. Oscillating machine comprising stator means having at least two poles, a shaft rotatably mounted in said stator means, a pair of rotor means rotatably mounted coaxially circumjacent said shaft and having poles circumferentially spaced from the respective poles of said stator means cooperating respectively with the poles of said stator means, each said rotor pole being circumferentially attracted to its respective stator pole upon effecting of a magnetic field therebetween, coil means mounted coaxially circumjacent said rotor means for effecting an axial magnetic flux in said rotor means, said poles being positioned such that upon energization of said coil means, with consequent axial magnetization of said rotor means, said rotor means are rotated in opposite directions, said shaft and each of said rotor means having means for coupling rotor means movement to said shaft, one of said coupling means serving to couple one of said rotor means to said shaft upon coil energization of a given polarity, while the other said rotor means is decoupled from said shaft, the other coupling means serving to couple the other of said rotor means to said shaft upon coil energization of opposite polarity while said one rotor means is decoupled from said shaft, whereby said shaft may be selectively rotated in either direction in dependence upon polarity of coil energization.

16. Oscillating machine comprising stator means having at least two poles, a shaft rotatably mounted in said stator means, a pair of adjacent rotor means rotatably mounted coaxially circumjacent said shaft and having poles circumferentially spaced from the respective poles of said stator means cooperating respectively with the poles of said stator means, each said rotor pole being circumferentially attracted to its respective stator pole upon effecting of a magnetic field therebetween, coil means mounted coaxially circumjacent said rotor means for effecting an axial magnetic flux in said rotor means, said poles being positioned such that upon energization of said coil means, with consequent axial magnetization of said rotor means, said rotor means are rotated in opposite directions, said shaft and each of said rotor means having means for coupling rotor means movement to said shaft, one of said coupling means serving to couple one of said rotor means to said shaft upon coil energization of a given polarity while the other said rotor means is decoupled from said shaft, the other coupling means serving to couple the other of said rotor means to said shaft upon coil energization of opposite polarity while said one rotor means is decoupled from said shaft, whereby said shaft may be selectively rotated in either direction in dependence upon polarity of coil energization, and torsion spring means interconnecting said adjacent rotor means thereby to bias said two rotor means in opposite directions.

17. Coupling mechanism comprising movable means, cooperating movably mounted pawl means selectively engageable with and disengageable from said movable means, at least a portion of one of said means being magnetically polarized, and means for effecting a magnetic field to selectively engage or disengage said means.

18. Coupling mechanism comprising toothed means, cooperating movably mounted pawl means selectively engageable and disengageable with respect to said toothed means, at least a portion of one of said means being magnetically polarized, and means for effecting a magnetic field to selectively engage and disengage said toothed and pawl means.

19. Coupling mechanism comprising toothed means, cooperating movably mounted pawl means selectively engageable and disengageable with respect to said toothed means, at least a portion of one of said means being permanently magnetized, and means for effecting a magnetic field to selectively engage or disengage said means.

20. Ratchet and pawl apparatus comprising a ratchet, a cooperating movably mounted pawl selectively engageable and disengageable with respect to said ratchet, said pawl being permanently magnetized, and means for effecting magnetic fields to selectively attract or repel said pawl with respect to said ratchet.

21. Balanced pawl means comprising a pawl, a pivot pin projecting through said pawl at the center thereof, said pivot pin having a kerfed head and a circumferential groove communicating with the ends of the kerf, an elongate spring disposed in said kerf, and doubled back at each end to reside in a portion of said groove, and means attaching the ends of said spring in the respective ends of said pawl.

22. Balanced pawl means comprising a pawl having pockets at each end, a pivot pin projecting through said pawl at the center thereof, said pin having a diametral passageway, an elongate spring disposed in said passageway, the ends of said spring residing in the respective said pockets.

References Cited in the file of this patent

UNITED STATES PATENTS

| | | |
|---|---|---|
| 481,701 | Lundell | Aug. 30, 1892 |
| 490,449 | Lundell | Jan. 24, 1893 |
| 1,022,742 | Kellum | Apr. 9, 1912 |
| 1,061,624 | Moore | May 13, 1913 |
| 1,739,885 | Zbinden | Dec. 17, 1929 |
| 1,952,695 | Webb et al. | Mar. 27, 1934 |
| 2,012,207 | Walton | Aug. 20, 1935 |
| 2,069,991 | Blanchard | Feb. 9, 1937 |
| 2,091,824 | Lewis | Aug. 31, 1937 |
| 2,096,458 | Johnson | Oct. 19, 1937 |
| 2,420,047 | Marien | May 6, 1947 |
| 2,449,901 | Kaiser | Sept. 21, 1948 |
| 2,456,967 | Livers | Dec. 21, 1948 |
| 2,510,583 | Johnson et al. | June 6, 1950 |
| 2,516,191 | Englesson | July 25, 1950 |
| 2,570,518 | Bryan | Oct. 9, 1951 |
| 2,574,997 | Askren | Nov. 13, 1951 |
| 2,741,712 | Lonnqvist | Apr. 10, 1956 |
| 2,796,571 | Dunn | June 18, 1957 |

FOREIGN PATENTS

| | | |
|---|---|---|
| 414,688 | Great Britain | July 30, 1934 |
| 572,979 | France | Mar. 1, 1924 |